No. 831,980. PATENTED SEPT. 25, 1906.
J. S. PARKE.
FISH HOOK.
APPLICATION FILED DEC. 14, 1905.
Fig. I
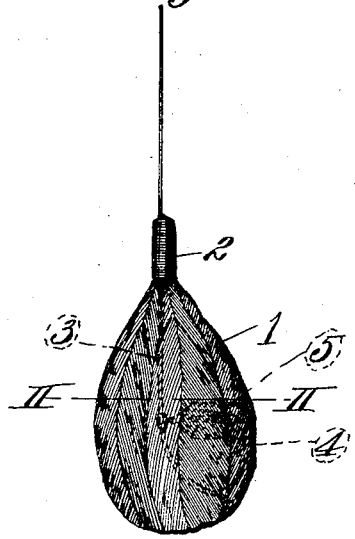
Fig. II
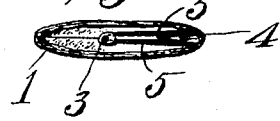
Fig. III
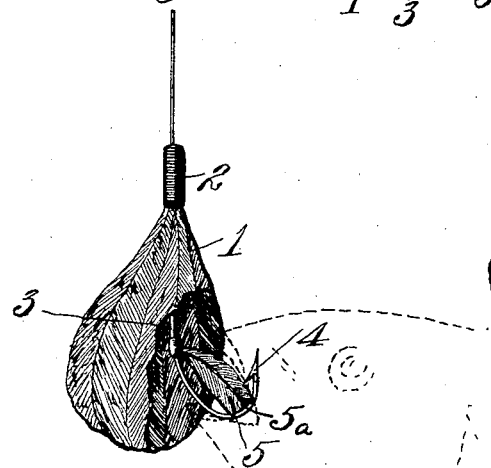
Fig. IV
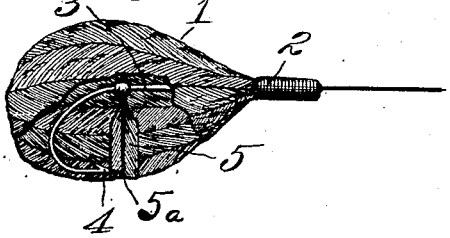
Attest:
Wm. H. Scott
H. S. Cook
Inventor:
Jno. S. Parke,
by Wright Bros.
Attys.

UNITED STATES PATENT OFFICE.

JOHN S. PARKE, OF ST. LOUIS, MISSOURI.

FISH-HOOK.

No. 831,980.  Specification of Letters Patent.  Patented Sept. 25, 1906.

Application filed December 14, 1905. Serial No. 291,666.

*To all whom it may concern:*

Be it known that I, JOHN S. PARKE, a citizen of the United States of America, residing in the city of St. Louis and State of Missouri, have invented certain new and useful Improvements in Fish-Hooks, of which the following is a full, clear, and exact description, reference being had to the accompanying drawings, forming part of this specification.

The object of this invention is to provide an improved arrangement whereby the barbed point of a fish-hook is prevented from being caught when being dragged through the water over brush, weeds, or other objects that may be encountered in the water and without being an obstacle to prevent the fish from seizing the hook and readily becoming caught thereby.

Figure I is a side view of my fish-hook. Fig. II is a transverse section taken on line II II, Fig. I. Fig. III is a side view with one of the hook-incasing members partly broken away, the parts being in the position assumed when the fish is being caught. Fig. IV is a side view of my device with one of the hook-incasing members partly broken away as it appears while being drawn through the water.

1 represents a pair of layers of feathers incasing the fish-hook at its two sides and firmly attached to the base of the hook 2 by wire, cord, or other convenient means of attachment.

3 represents the shank of the fish-hook; 4, the barbed point.

5 represents stiff feathers, of which there are preferably two, one on either side, firmly attached to the shank 3 and extending transversely thereof a short distance beyond and in front of the barbed point 4 and at a right angle thereto, thus affording a secure protection to the barbed point, substantially as shown by Fig. IV in the drawings. The stems 5ª of the stiff feathers 5 extend from the shank of the hook 3 straight across the hook to and beyond the extremity of the barbed point 4.

While I have mentioned the feathers as arranged in layers at the sides of the hook, I do not wish to be understood as limiting myself to this particular arrangement, as it is obvious one layer alone might be used at one side of the hook or that a tuft of feathers might be applied to the hook to incase it.

My fish-hook having the feathers applied thereto as described is more particularly intended for use in "fly-fishing," in which use the layers of feathers serve as "flies" to attract the fish. While the hook is preferably used in the manner just stated, in which instance no bait is necessary, I wish it understood that I do not limit myself to the use of the hook in any special form of fishing, as it may be baited and used as an ordinary fish-hook. If so used, the snag-proof features have the same merit as in fly-fishing.

I claim—

1. A fish-hook comprising a shank, a barbed point and a stiff supporting-feather secured to the shank at right angles to the barbed point and extending transversely of the hook from the shank thereof directly to and across the extremity of the barbed point so as to support the hook while passing over obstacles.

2. A fish-hook comprising a shank, a barbed point, and stiff supporting-feathers secured to the shank at right angles thereto and extending transversely of the hook from the shank thereof on both sides of the hook directly to and across the extremity of the barbed point so as to support the hook while passing over obstacles.

3. A fish-hook comprising a shank, a barbed point, layers of feathers secured to the base of the hook and incasing the shank and barbed point, and stiff supporting-feathers secured to the shank at right angles thereto between the layers of feathers and extending transversely of the hook from the shank thereof directly to and across the extremity of the barbed point so as to support the hook while passing over obstacles.

JOHN S. PARKE.

In presence of—
E. S. KNIGHT,
NELLIE V. ALEXANDER.